March 30, 1965   M. A. MORFORD   3,175,574
GARDEN HOSE SUPPORT AND RETRIEVING MEANS
Filed Sept. 23, 1964
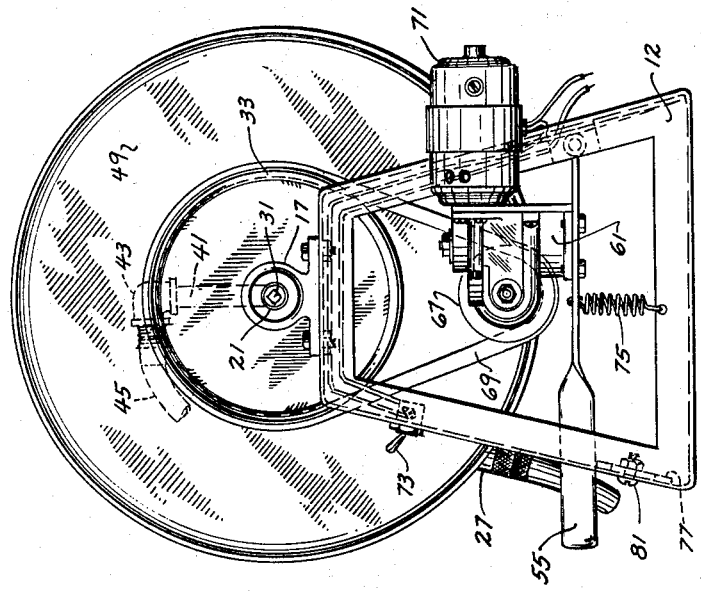
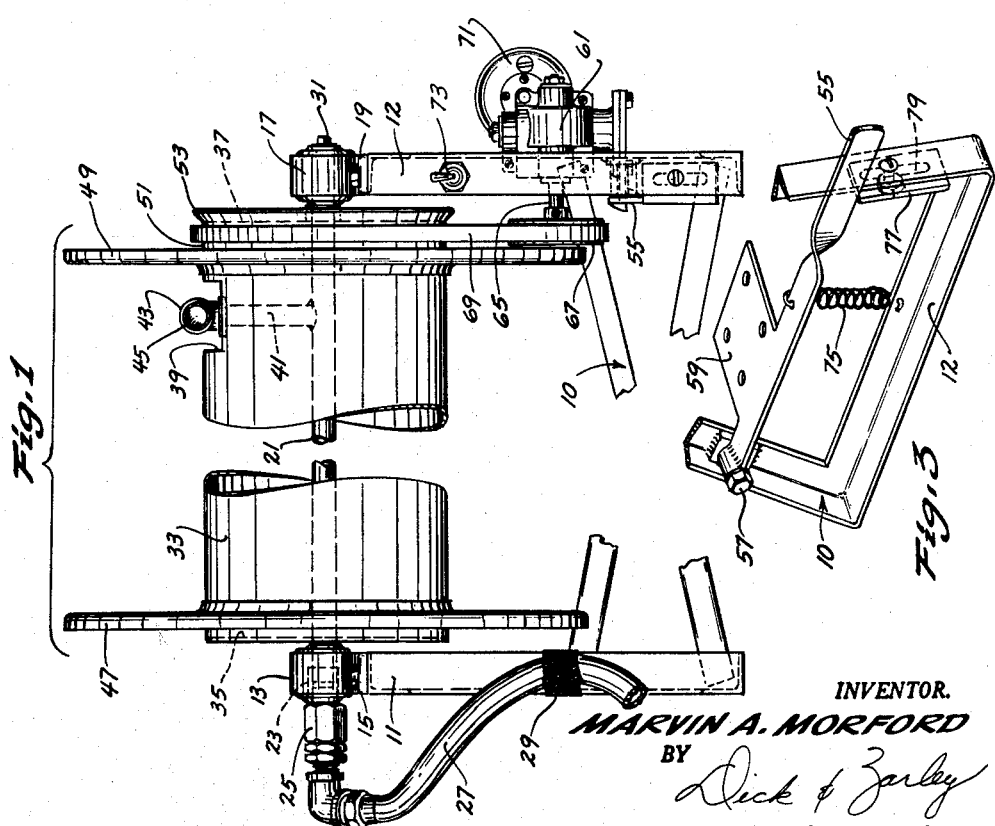
INVENTOR.
MARVIN A. MORFORD
BY
Dick & Harley
ATTORNEYS

United States Patent Office 3,175,574
Patented Mar. 30, 1965

3,175,574
GARDEN HOSE SUPPORT AND RETRIEVING
MEANS
Marvin A. Morford, 1815 Ashwood Road,
West Des Moines, Iowa
Filed Sept. 23, 1964, Ser. No. 398,582
5 Claims. (Cl. 137—355.26)

This is a continuation-in-part application of the application filed May 1, 1961, having a serial number 106,560 and now abondoned. This invention relates to means for supporting a garden hose or the like and more particularly to one that will retrieve and rewind the hose onto its drum after use.

One of the most objectionable phases in the use of a garden hose is the task of first uncoiling before use and then the retrieving and replacing of it after use. Large industrial operations do have equipment for mechanically handling liquid and gas conduits, but obviously such costly and complicated apparatuses are not feasible for the home owner nor small operator.

Therefore one of the principal objects of this invention is to provide a simple, safe hose supporting means that will permit the rapid and easy unwinding of the hose and after use, the rewinding of the hose by a prime mover.

A further object of this invention is to provide a rotatable drum support for a hose that does not require the detachment of the hose from the source of water or like supply.

A still further object of this invention is to provide a hose supporting and retrieving means wherein a horizontal drum serves not only to store the hose thereon but also serves as a "pulley" for driving the device.

A still further object of this invention it to provide a hose supporting and retrieving means which is initially unwound by hand but which yieldably resists such unwinding to prevent the phenomenon of backlash from occurring.

A still further object of this invention is to provide a hose supporting and retrieving means wherein a horizontal rotatable drum has one end thereof flared to prevent the disengagement of a belt means therefrom.

A still further object of this invention is to provide a hose supporting and retrieving means that is economically manufactured, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a fragmentary side elevational view of the device;

FIG. 2 is an end elevational view of the device; and

FIG. 3 is a partial perspective vew of an end support of the device illustrating the attached lever means.

The numeral 10 generally designates a frame having an A-frame portion 11 at one end and an A-frame portion 12 at its other end. A hollow bearing 13 is secured to the upper end of A-frame portion 11 by means of bolts 15 and a hollow bearing 17 is secured to the upper end of A-frame portion 12 by means of bolt members 19. An elongated hollow pipe 21 is rotatably received by bearings 13 and 17 and extends therebetween as seen in FIG. 1. One end of pipe 21 has a coupling 23 threadably secured thereto which is adapted to receive a swivel hose connection 25. An elongated flexible hose 27 is secured to swivel hose connection 25 and extends through a source of fluid. For convenience, elongated hose 27 is secured to A-frame portion 11 by means of tape 29 or the like to prevent tangling of the hose adjacent the device.

The other end of pipe 21 threadably receives a plug member 31 to prevent leakage of fluid therefrom.

An elongated hollow cylinder or drum 33 is axially mounted on pipe member 21 between bearing members 13 and 17 and includes opposite end members 35 and 37 through which pipe 21 extends. The outer ends of end members 35 and 37 are permanently secured to pipe 21 by means of welding or the like. As seen in FIG. 1, drum 33 is provided with a cut away portion 39 through which extends a pipe stub 41 extending outwardly from pipe 21 and which is in communication therewith. The outer end of pipe stub 41 has threadably secured thereto an elbow member 43 which is adapted to threadably receive one end of an elongated flexible hose 45. Drum 33 has secured thereto by means of welding or the like a flange plate 47 radially extending outwardly therefrom adjacent end 35 as seen in FIG. 1. A flange plate 49 is secured to drum 33 inwardly from end 37 by means of welding or the like and radially extends outwardly therefrom as seen in FIG. 1 to provide a belt engaging portion 51 on drum 33. Drum 33 is provided with a flared-out portion 53 on the outer end of belt engaging portion 51, the purpose of which will be later described.

The numeral 55 designates a hand lever having one end pivotally secured by means of bolt 57 to one standard of the A-frame portion 12. Extending outwardly from hand lever 55 is a gear box platform 59. As seen in FIGS. 1 and 2, a gear box 61 is mounted on gear box platform 59 by means of bolts 63. Extending inwardly from gear box 61 is a power shaft 65 having a pulley 67 mounted thereon. A flexible continuous belt 69 is mounted on pulley 67 and extends around belts receiving portion 51 on drum 33 as seen in FIGS. 1 and 2. An electric motor 71 is operatively connected to gear box 61 for operating power shaft 65 and is connected to a source of electrical energy in conventional fashion and has a switch 73 operatively connected thereto for turning the motor on and off. Hand lever 55 has secured intermediate its length a spring member 75 which extends downwardly to and is connected to the bottom portion of A-frame portion 12 as seen in FIG. 2. Spring 75 is adapted to pull hand lever 55 downwardly to create tension in belt 69. A rectangular plate member 77 having an elongated slot 79 formed therein is secured to the other standard of A-frame portion 12 by means of bolt member 81 extending through the standard and through slot 79 as seen in FIG. 3. It should be noted that a portion of the upper end of plate member 77 is exposed to provide a retaining means to receive hand lever 55 as seen in FIG. 3.

The normal method of operation of the device is as follows:

The unit is installed at the desired location and a hose 27 is connected to the outer end of the swivel hose connection 25 is conventional fashion. Whenever it is desired for water or the like to flow through the device, the other end of hose 27 is operatively placed in communication with a source of such liquid under pressure. With the hand lever 55 lifted and placed on the receiving portion of plate member 77, the motor 71 will be lifted accordingly and the belt 69 will be in a slack condition to permit hose 45 to be unwound as drum 33 is rotated by such unwinding. Plate member 77 has been previously positioned so that some tension still exists in belt 69 and as a result, friction is present between belt 69 and as a result, friction is present between belt 69 and belt receiving portion 51. Therefore, belt 69 frictionally resists the rotation of drum 33 as hose 45 is being unwound therefrom. The frictional resistance is of such a degree that it does not hamper the unwinding of hose 45 but is sufficient enough to cause drum 33 to cease rotating as soon as hose 35 ceases to be unwound therefrom. If drum 33 were free-wheeling the drum would continue to rotate even after hose 45 ceases to be unwound therefrom thereby causing a backlash phenomenon to occur with resulted fouling of the hose. As belt 69 becomes worn or stretches, it is simply necessary to vertically move plate member 77 on bolt member 81. If plate member 77 were not vertically adjustable, it would be impossible to create a frictional resistance between belt 69 and receiving portion 51 once the belt has become worn or stretched.

As stated before, by pulling on the outer end of hose 45, the drum will rotate and the desired hose length will unwind from the drum. Swivel hose connection 25 permits rotation of the drum with respect to hose 27. With the hose 27 in communication with a source of liquid under pressure, the liquid will pass through the parts 25, 23, 21, 41, 43 and then out of hose 45. This will occur regardless of the amount of hose 45 which has been unreeled from the drum.

To reel in hose 45, it is simply necessary to place the switch to the "on" position and to remove the hand lever from the upper end of plate member 77. Spring 75 will pull lever 55 downwardly, thereby tightening belt 69 on the pulley wheel 67 and belt receiving portion 51. The motor will then rotate the drum in a reverse rotation, thereby rewinding the unreeled hose back onto and around the drum. After the hose has been wound up onto the drum, switch 73 is turned off to de-energize motor 71.

By providing a flared portion 53 on the end of drum 33, belt 69 is prevented from inadvertently passing off of the outer end thereof. It should be noted that by providing a belt engaging portion 51 which is integral with drum 33, the need for a special or an additional pulley thereon is eliminated. It can be seen that flange members 47 and 49 create a storage area for the hose 45 as it is wound around drum 33 and that flange 49 prevents belt 69 from engaging hose 45 and causing damage thereto.

Thus from the foregoing it can be seen that the device accomplishes at least all of its stated objectives.

Some changes may be made in the construction and arrangement of my garden hose support and retrieving means without departing from the real spirit and purpose of my invention, and it is my intention to cover by my claims, any modified forms or structure or use of mechanical equivalents which may be reasonably included within their scope.

I claim:
1. In a hose support and retriever,
a frame including first and second spaced apart end supports,
first and second bearing means on the upper ends of said first and second end supports respectively,
an elongated pipe rotatably mounted in said first and second bearing means and extending therebetween, one end of said pipe being closed, the other end of said pipe being adapted to receive a swivel hose connection,
a horizontal cylindrical drum axially mounted on said pipe between said first and second bearing means,
said drum having an opening formed therein adjacent one of its ends,
an elongated flexible hose having one end thereof extending inwardly into said opening in said drum, said hose being adapted to be wound around said drum,
a means connecting said one end of said hose to said pipe,
a first flange plate on said drum adjacent one end thereof radially extending outwardly therefrom,
a second flange plate on said drum radially extending outwardly therefrom and being positioned inwardly from the other end thereof to provide a belt engaging portion on that end of said drum,
a lever pivotally secured to said frame,
a motor means mounted on said lever,
said motor means having a power shaft with a belt pulley thereon which is located below said belt receiving portion of said drum,
a continuous belt extending around said pulley and said belt receiving portion of said drum,
a spring means connected to and extending between said frame and said lever to normally pull said lever downwardly to effect tension in said belt,
said drum being flared outwardly at the outer end of said belt receiving portion to maintain said belt on said drum,
and a retaining means on said frame above said lever and in the pivotal path thereof,
said retaining means being adapted to maintain said lever in a raised position against the tension in said spring means to reduce the tension in said belt means to permit said drum to be yieldably rotated with respect to said belt means at times.
2. In a hose support and retriever,
a frame including first and second spaced apart end supports,
first and second bearing means on the upper ends of said first and second end supports respectively,
an elongated pipe rotatably mounted in said first and second bearing means and extending therebetween, one end of said pipe being closed, the other end of said pipe being adapted to receive a swivel hose connection,
a horizontal cylindrical drum axially mounted on said pipe between said first and second bearing means,
said drum having an opening formed therein adjacent one of its ends,
an elongated flexible hose having one end thereof extending inwardly into said opening in said drum, said hose being adapted to be wound around said drum,
a means connecting said one end of said hose to said pipe,
a first flange plate on said drum adjacent one end thereof radially extending outwardly therefrom,
a second flange plate on said drum radially extending outwardly therefrom and being positioned inwardly from the other end thereof to provide a belt engaging portion on that end of said drum,
a lever pivotally secured to said frame,
a motor means mounted on said lever,
said motor means having a power shaft with a belt pulley thereon which is located below said belt receiving portion of said drum,
a continuous belt extending around said pulley and said belt receiving portion of said drum,
a spring means connected to and extending between said frame and said lever to normally pull said lever downwardly to effect tension in said belt,
said drum being flared outwardly at the outer end of said belt receiving portion to maintain said belt on said drum,
and an adjustable retaining means on said frame above said lever and in the pivotal path thereof,
said retaining means being adapted to maintain said lever in a raised position against the tension in said spring means to reduce the tension in said belt means to permit said drum to be yieldably rotated with respect to said belt means at times.
3. In a hose support and retriever,
a frame including first and second spaced apart end supports,
first and second bearing means on the upper ends of said first and second end supports respectively,
an elongated pipe rotatably mounted in said first and second bearing means and extending therebetween, one end of said pipe being closed, the other end of said pipe being adapted to receive a swivel hose connection, a horizontal cylindrical drum axially mounted on said pipe between said first and second bearing means, said drum having an opening formed therein adjacent one of its ends, an elongated flexible hose having one end thereof extending inwardly into said opening in said drum, said hose being adapted to be wound around said drum, a means connecting said one end of said hose to said pipe, a first flange plate on said drum adjacent one end thereof radially extending outwardly therefrom, a second flange plate on said drum radially extending outwardly therefrom and being positioned inwardly from the other end thereof to provide a belt engaging portion on that end of said drum, a lever pivotally secured to said frame, a motor means mounted on said lever, said motor means having a power shaft with a belt pulley thereon which is located below said belt receiving portion of said drum, a continuous belt extending around said pulley and said belt receiving portion of said drum, a spring means connected to and extending between said frame and said lever to normally pull said lever downwardly to effect tension in said belt, said drum being flared outwardly at the outer end of said belt receiving portion to maintain said belt on said drum, and a vertically adjustable retaining means on said frame above said lever and in the pivotal path thereof, said retaining means being adapted to maintain said lever in a raised position against the tension in said spring means to reduce the tension in said belt means to permit said drum to be yieldably rotated with respect to said belt means at times.

4. The device of claim 3 wherein said vertically adjustable retaining means is comprised of a rectangular plate member having a longitudinal slot formed therein; said plate member being secured to said frame by means of a bolt means extending through said frame and said longitudinal slot in said plate member; said plate member having a portion of its upper end extending outwardly from said frame to provide a lever engaging portion.

5. In a hose support and retriever, a frame including first and second spaced apart end supports, first and second bearing means on the upper ends of said first and second end supports respectively, an elongated pipe rotatably mounted in said first and second bearing means and extending therebetween, one end of said pipe being closed, the other end of said pipe being adapted to receive a swivel hose connection, a horizontal cylindrical drum axially mounted on said pipe between said first and second bearing means, said drum having an opening formed therein adjacent one of its ends, a pipe stub extending outwardly from said pipe towards said opening in said drum, an elongated flexible hose having one end thereof operatively connected to said pipe stub, said hose being adapted to be wound around said drum, a first flange plate on said drum adjacent one end thereof radially extending outwardly therefrom, a second flange plate on said drum radially extending outwardly therefrom and being positioned inwardly from the other end thereof to provide a belt engaging portion on that end of said drum, a lever pivotally secured to said frame, a motor means mounted on said lever, said motor means having a power shaft with a belt pulley thereon which is located below said belt receiving portion of said drum, a continuous belt extending around said pulley and said belt receiving portion of said drum, a spring means connected to and extending between said frame and said lever to normally pull said lever downwardly to effect tension in said belt, said drum being flared outwardly at the outer end of said belt receiving portion to maintain said belt on said drum, and a retaining means on said frame above said lever and in the pivotal path thereof, said retaining means being adapted to maintain said lever in a raised position against the tension in said spring means to reduce the tension in said belt means to permit said drum to be yieldably rotated with respect to said belt means at times.

References Cited by the Examiner

UNITED STATES PATENTS 2,283,153   5/42   Koch _____ 72—242.15 X
2,339,668   1/44   Baldwin e al. _____ 137—355.2 X

FOREIGN PATENTS 711,960   7/54   Great Britain.

M. CAREY NELSON, *Primary Examiner.*